UNITED STATES PATENT OFFICE.

JACOB SCHWARTZ, OF PORTLAND, OREGON.

DENTIFRICE.

SPECIFICATION forming part of Letters Patent No. 380,700, dated April 10, 1888.

Application filed January 6, 1888. Serial No. 260,003. (No specimens.)

*To all whom it may concern:*

Be it known that I, JACOB SCHWARTZ, a citizen of the United States, residing at Portland, county of Multnomah, and State of Oregon, have invented a new and useful Composition of Matter to be Used as a Dentifrice and for the Treatment of Toothache, of which the following is a specification.

To form this dentifrice I mix water, one gallon; pulverized alum, twenty ounces; common table-salt, twenty ounces; laudanum, one-half ounce; oil of peppermint, fifty drops; oil of cloves, forty drops; alcohol, one-half pint; raspberry-sirup, one-half pint. I compound these ingredients in the following manner: On twenty ounces of the salt and an equal quantity of the alum I pour one gallon of boiling water, stirring briskly until partially cooled. After allowing the mixture to stand and settle for twenty-four hours, I pour off the clear liquor, to which I add one-half ounce of laudanum, fifty drops of oil of peppermint, forty drops of oil of cloves, and one-half pint of raspberry-sirup, to which has been added one-half pint of alcohol.

The principal and active ingredients in this mixture are the alum, salt, and laudanum. The others are merely auxiliary for the purpose of imparting to the mixture a more pleasant taste, smell, and color, and are not essential to its efficacy.

If a bit of cotton be saturated with this preparation and well rubbed onto the aching tooth and gums, it will speedily relieve toothache. If used as a dentifrice, it will prevent and arrest decay of the teeth.

What I claim, and desire to secured by Letters Patent of the United States, is—

The herein-described composition of matter to be used as a dentifrice and for toothache, consisting of alum, salt, laudanum, water, oil of peppermint, oil of cloves, alcohol, and raspberry-sirup, in the proportions specified.

JACOB SCHWARTZ.

Witnesses:
J. FLEISCHNER,
CHARLES LARSEN.